United States Patent
Jung et al.

(10) Patent No.: US 11,909,029 B2
(45) Date of Patent: Feb. 20, 2024

(54) POSITIVE ELECTRODE HAVING LITHIUM TRANSITION METAL OXIDE CONTAINING NICKEL, COBALT AND MANGANESE FOR SECONDARY BATTERY AND SECONDARY BATTERY INCLUDING THE SAME

(71) Applicant: LG Chem, Ltd., Seoul (KR)

(72) Inventors: Won Sig Jung, Daejeon (KR); Sang Soon Choi, Daejeon (KR); Hyun Ah Park, Daejeon (KR)

(73) Assignee: LG Chem, Ltd. (KR)

(*) Notice: Subject to any disclaimer, the term of this patent is extended or adjusted under 35 U.S.C. 154(b) by 638 days.

(21) Appl. No.: 17/055,012

(22) PCT Filed: May 21, 2019

(86) PCT No.: PCT/KR2019/006051
§ 371 (c)(1),
(2) Date: Nov. 12, 2020

(87) PCT Pub. No.: WO2019/225939
PCT Pub. Date: Nov. 28, 2019

(65) Prior Publication Data
US 2021/0218012 A1 Jul. 15, 2021

(30) Foreign Application Priority Data
May 21, 2018 (KR) .................. 10-2018-0057962

(51) Int. Cl.
*H01M 4/131* (2010.01)
*H01M 4/505* (2010.01)
(Continued)

(52) U.S. Cl.
CPC .......... *H01M 4/131* (2013.01); *H01M 4/505* (2013.01); *H01M 4/525* (2013.01); *H01M 4/621* (2013.01);
(Continued)

(58) Field of Classification Search
CPC ...... H01M 4/131; H01M 4/505; H01M 4/525; H01M 4/621; H01M 10/052; H01M 10/42
See application file for complete search history.

(56) References Cited

U.S. PATENT DOCUMENTS 10,128,499 B2 * 11/2018 Song .................. H01M 4/628
2007/0248886 A1 10/2007 Shirakata et al.
(Continued)

FOREIGN PATENT DOCUMENTS

CN 101047268 A 10/2007
JP 2013164942 A 8/2013
(Continued)

OTHER PUBLICATIONS

Extended European Search Report including Written Opinion for Application No. 19807745.5 dated Apr. 21, 2021, pp. 1-10.
(Continued)

*Primary Examiner* — Michael Jung
(74) *Attorney, Agent, or Firm* — Lerner David LLP (57) ABSTRACT

A positive electrode for a secondary battery includes a positive electrode active material layer, which includes a positive electrode active material including a lithium transition metal oxide which contains nickel, cobalt, and manganese and has an atomic ratio of nickel in total transition metals of 80 atm % or more, and a metal oxide including a metallic element having a binding potential with lithium of 0.5 V to 4 V. A secondary battery including the positive electrode is also provided.

7 Claims, 3 Drawing Sheets

(51) Int. Cl.
　　*H01M 4/525*　　(2010.01)
　　*H01M 4/62*　　(2006.01)
　　*H01M 10/052*　　(2010.01)
　　*H01M 10/42*　　(2006.01)
　　*H01M 4/36*　　(2006.01)

(52) U.S. Cl.
　　CPC ......... *H01M 10/052* (2013.01); *H01M 10/42* (2013.01); *H01M 4/366* (2013.01)

(56) References Cited

U.S. PATENT DOCUMENTS

| | | |
|---|---|---|
| 2015/0349339 A1 | 12/2015 | Cho et al. |
| 2017/0125845 A1* | 5/2017 | Yu .................... H01M 10/0568 |
| 2017/0222223 A1 | 8/2017 | Hong et al. |
| 2018/0166687 A1* | 6/2018 | Chang .................. H01M 4/505 |
| 2018/0241036 A1 | 8/2018 | Jo et al. |
| 2019/0190019 A1 | 6/2019 | Lee et al. |
| 2020/0075955 A1* | 3/2020 | Jeon ...................... H01M 4/505 |
| 2020/0106095 A1* | 4/2020 | Nam ..................... H01M 4/485 |

FOREIGN PATENT DOCUMENTS

| | | |
|---|---|---|
| JP | 2016162602 A | 9/2016 |
| JP | 2018503238 A | 2/2018 |
| KR | 20110079025 A | 7/2011 |
| KR | 20140084567 A | 7/2014 |
| KR | 20150016129 A | 2/2015 |
| KR | 20160036402 A | 4/2016 |
| KR | 20170063373 A | 6/2017 |
| KR | 20170090196 A | 8/2017 |
| KR | 20170118493 A | 10/2017 |
| KR | 101812269 B1 | 1/2018 |
| KR | 20180010299 A | 1/2018 |
| KR | 20180023732 A | 3/2018 |
| WO | 2016089177 A1 | 6/2016 |

OTHER PUBLICATIONS

Sun, Y. et al., "A Novel Cathode Material with a Concentration-Gradient for High-Energy and Safe Lithium-Ion Batteries", Advanced Functional Materials, Feb. 2010, pp. 485-491, vol. 20.

International Search Report for Application No. PCT/KR2019/006051 dated Aug. 26, 2019, 2 pages.

Search Report dated Feb. 2, 2023 from the Office Action for Chinese Application No. 201980029304.1 dated Feb. 4, 2023, 2 pages.

* cited by examiner

001
POSITIVE ELECTRODE HAVING LITHIUM TRANSITION METAL OXIDE CONTAINING NICKEL, COBALT AND MANGANESE FOR SECONDARY BATTERY AND SECONDARY BATTERY INCLUDING THE SAME

CROSS-REFERENCE TO RELATED APPLICATIONS

This application is a national phase entry under 35 U.S.C. § 371 of International Application No. PCT/KR2019/006051, filed on May 21, 2019, which claims priority of Korean Patent Application No. 10-2018-0057962, filed on May 21, 2018, in the Korean Intellectual Property Office, the disclosures of which are incorporated herein in its entirety by reference.

TECHNICAL FIELD

The present invention relates to a positive electrode for a secondary battery and a secondary battery including the same. More particularly, the present invention relates to a positive electrode for a secondary battery which has excellent thermal stability and a secondary battery including the same.

BACKGROUND ART

Demand for secondary batteries with semi-permanent characteristics, which may be repeatedly used due to their rechargeability, among renewable energies has been significantly increased as interest in the renewable energies able to replace nuclear power and fossil fuel has increased while environmental issues have recently emerged.

Among these secondary batteries, lithium secondary batteries receive the most attention due to their excellent cycle life characteristics and high energy density. Various lithium transition metal oxides, such as $LiCoO_2$, $LiNiO_2$, $LiMnO_2$, $LiMn_2O_4$, $LiFePO_4$, and $Li(Ni_aCo_bMn_c)O_2$ (where a, b, c are atomic fractions of each independent oxide composition elements, wherein $0<a<1$, $0<b<1$, $0<c<1$, and $a+b+c=1$, and, hereinafter, referred to as "NCM-based lithium oxide"), have been developed as positive electrode active materials for a lithium secondary battery. Among these lithium transition metal oxides, development of a high-Ni NCM-based lithium oxide, in which a nickel content has been increased to satisfy high capacity characteristics, has recently been actively conducted.

With respect to a positive electrode using the high-Ni NCM-based lithium oxide as a positive electrode active material, there is an excellent effect in terms of capacity achievement, but there is a limitation in that thermal stability is rapidly reduced because structural stability and chemical stability of the active material are deteriorated as the nickel content is increased. Particularly, in a case in which a positive electrode active material, in which a nickel content is 80 atm % or more of total transition metals, is used, such limitation is evident.

In order to address the above-described limitation, studies have been made to improve the structural stability of the high-Ni-based positive electrode active material by doping or coating the positive electrode active material with metallic elements, but it has been difficult to secure sufficient thermal stability by the above method.

Thus, there is a need to develop a positive electrode having excellent thermal stability as well as high capacity.

PRIOR ART DOCUMENT (Patent Document 1) Korean Patent Application Laid-open Publication No. 10-2014-0084567 (Publication Date: 2014 Jul. 7)

DISCLOSURE OF THE INVENTION

Technical Problem

An aspect of the present invention provides a positive electrode having excellent thermal stability, in which heat generation of the positive electrode is delayed and an instantaneous calorific value is low during charge and discharge by including a metal oxide having a lower binding potential with lithium than a positive electrode active material in a positive electrode active material layer, and a secondary battery including the same.

Technical Solution

According to an aspect of the present invention, there is provided a positive electrode for a secondary battery including a positive electrode active material layer which includes: a positive electrode active material including a lithium transition metal oxide which contains nickel, cobalt, and manganese and has an atomic ratio of nickel in total transition metals of 80 atm % or more, and a metal oxide including a metallic element having a binding potential with lithium of 0.5 V to 4 V.

In this case, the metal oxide may include at least one metallic element selected from the group consisting of molybdenum (Mo), vanadium (V), titanium (Ti), zirconium (Zr), iron (Fe), niobium (Nb), tungsten (W), copper (Cu), nickel (Ni), manganese (Mn), cobalt (Co), bismuth (Bi), antimony (Sb), gallium (Ga), and germanium (Ge), and may specifically include at least one selected from the group consisting of $MoO_3$, $V_2O_5$, $ZrO_2$, $TiO_2$, $WO_3$, $CuO$, $NiO$, $MnO_2$, $Co_3O_4$, $Bi_2O_3$, $Sb_2O_3$, $Ga_2O_3$, and $GeO_2$.

The metal oxide may be included in an amount of 0.1 wt % to 2 wt % based on a total weight of the positive electrode active material layer.

The lithium transition metal oxide may be represented by Formula 1.

$$Li_{1+x}[Ni_yCo_zMn_wM_v]O_{2-p}B_p \qquad [\text{Formula 1}]$$

In Formula 1, $0 \le x \le 0.3$, $0.8 \le y < 1$, $0 < z < 0.2$, $0 < w < 0.2$, $0 \le v \le 0.1$, and $0 \le p \le 0.1$, M includes at least one element selected from the group consisting of tungsten (W), copper (Cu), iron (Fe), vanadium (V), chromium (Cr), titanium (Ti), zirconium (Zr), zinc (Zn), aluminum (Al), tantalum (Ta), yttrium (Y), indium (In), lanthanum (La), strontium (Sr), gallium (Ga), scandium (Sc), gadolinium (Gd), samarium (Sm), calcium (Ca), cerium (Ce), niobium (Nb), magnesium (Mg), boron (B), and molybdenum (Mo), and B includes at least one element selected from the group consisting of fluorine (F), chlorine (Cl), bromine (Br), iodine (I), astatine (At), and sulfur (S).

According to an embodiment, at least one element of nickel, cobalt, and manganese in the lithium transition metal oxide may have a concentration gradient.

According to another aspect of the present invention, there is provided a secondary battery including the positive electrode according to the present invention, a negative electrode, a separator, and an electrolyte.

In this case, self-heating time until temperature reaches 205° C., which is measured using accelerating rate calorimetry, of the secondary battery may be increased by 30% or more in comparison to self-heating time of a secondary battery including a positive electrode which includes a lithium transition metal oxide having the same composition and does not include a metal oxide. Also, an instantaneous calorific value, a value obtained by first differentiating the temperature of the secondary battery in a self-heating section, which is measured using the accelerating rate calorimetry, with respect to time, of the secondary battery may be 0.3 or less.

Advantageous Effects

With respect to a positive electrode according to the present invention, since lithium ions react with a metal oxide in an over-lithiated state, as in an over-discharged state, by including the metal oxide, which includes a metallic element having a lower binding potential with lithium than a positive electrode active material, in a positive electrode active material layer, heat generation and gas generation may be minimized. Accordingly, since a calorific value of a secondary battery using the positive electrode according to the present invention is low, the secondary battery has excellent thermal stability.

MODE FOR CARRYING OUT THE INVENTION

Hereinafter, the present invention will be described in more detail with reference to the drawings.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may comprise plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

In the present specification, the expression "%" denotes wt % unless otherwise indicated explicitly.

As a result of significant amount of research conducted to improve thermal stability of a positive electrode in which a high-Ni NCM-based lithium oxide with a nickel content of 80 atm % or more is used as a positive electrode active material, the present inventors have found that the thermal stability may be significantly improved by using the high-Ni NCM-based lithium oxide with a nickel content of 80 atm % or more and a metal oxide, which includes a metallic element having a lower binding potential with lithium than the positive electrode active material, together, thereby leading to the completion of the present invention.

Hereinafter, a positive electrode for a secondary battery according to the present invention will be described.

Positive Electrode

The positive electrode of the present invention includes a positive electrode active material layer including a positive electrode active material and a metal oxide.

The metal oxide includes a metallic element having a binding potential with lithium of 0.5 V to 4 V, and may specifically include at least one metallic element selected from the group consisting of molybdenum (Mo), vanadium (V), titanium (Ti), zirconium (Zr), iron (Fe), niobium (Nb), tungsten (W), copper (Cu), nickel (Ni), manganese (Mn), cobalt (Co), bismuth (Bi), antimony (Sb), gallium (Ga), and germanium (Ge). Preferably, the metal oxide may include at least one metallic element selected from the group consisting of Mo, V, Ti, Zr, Fe, Nb, and W.

According to studies by the present inventors, in a case in which the metal oxide including the metallic element having a lower binding potential with lithium is included in the positive electrode active material layer as described above, there is an effect of suppressing heat generation. A mechanism, in which the heat generation is suppressed by the metal oxide, is not clear, but it is assumed due to the fact that the metal oxide including the metal having a low binding potential with lithium reacts with lithium, in a state in which an excessive amount of the lithium is included in the positive electrode active material layer, as in an over-discharged state, to suppress heat generation and gas generation which occur when the excessive amount of the lithium is present on a surface of the positive electrode active material.

Specifically, the metal oxide may be at least one selected from the group consisting of $MoO_3$, $V_2O_5$, $ZrO_2$, $TiO_2$, $WO_3$, $CuO$, $NiO$, $MnO_2$, $Co_3O_4$, $Bi_2O_3$, $Sb_2O_3$, $Ga_2O_3$, and $GeO_2$, but the metal oxide is not limited thereto. Preferably, the metal oxide may be at least one selected from the group consisting of $MoO_3$, $V_2O_5$, $ZrO_2$, $TiO_2$, and $WO_3$.

The metal oxide may be included in an amount of 0.1 wt % to 2 wt %, preferably 0.1 wt % to 1 wt %, and more preferably 0.1 wt % to 0.5 wt % based on a total weight of the positive electrode active material layer. When the amount of the metal oxide satisfies the above range, an effect of suppressing heat generation may be excellent, and a decrease in capacity of the positive electrode may be minimized.

The positive electrode active material includes a lithium transition metal oxide with an amount of nickel in total transition metals of 80 atm % or more. Specifically, the lithium transition metal oxide may be represented by Formula 1 below.

$$Li_{1+x}[Ni_yCo_zMn_wM_v]O_{2-p}B_p \qquad \text{[Formula 1]}$$

In Formula 1, M is a doping element substituted for transition metal (Ni, Co, Mn) sites and may include at least one element selected from the group consisting of W, Cu, Fe, V, chromium (Cr), Ti, Zr, zinc (Zn), aluminum (Al), tantalum (Ta), yttrium (Y), indium (In), lanthanum (La), strontium (Sr), Ga, scandium (Sc), gadolinium (Gd), samarium (Sm), calcium (Ca), cerium (Ce), Nb, magnesium (Mg), boron (B), and Mo. Preferably, M may include at least one element selected from the group consisting of Al, Zr, W, Ti, Nb, and B.

B is an element substituted for oxygen sites in the lithium transition metal oxide and may include at least one element selected from the group consisting of fluorine (F), chlorine (Cl), bromine (Br), iodine (I), astatine (At), and sulfur (S).

The expression "1+x" represents a lithium atomic fraction in the lithium transition metal oxide, wherein x may satisfy $0 \leq x \leq 0.3$, may preferably satisfy $0 \leq x \leq 0.2$, and may more preferably satisfy $0 \leq x \leq 0.1$.

y represents an atomic fraction of nickel in the lithium transition metal oxide, wherein y may satisfy $0.8 \leq y < 1$.

z represents an atomic fraction of cobalt in the lithium transition metal oxide, wherein z may satisfy $0 < z < 0.2$.

w represents a manganese atomic fraction in the lithium transition metal oxide, wherein w may satisfy $0 < w < 0.2$.

When the molar ratios, y, z, and w, of transition metals in the lithium transition metal oxide satisfy the above ranges, a positive electrode active material having excellent energy density may be obtained.

v represents a molar ratio of the doping element M in the lithium transition metal oxide, wherein v may satisfy $0 \leq v \leq 0.1$, may preferably satisfy $0.0005 \leq v \leq 0.08$, and may more preferably satisfy $0.001 \leq v \leq 0.02$, for example, $0.002 \leq v \leq 0.01$.

p represents a molar ratio of the element B in the lithium transition metal oxide, wherein p may satisfy $0 \leq p \leq 0.1$ and may preferably satisfy $0 \leq p \leq 0.05$.

Specifically, the lithium transition metal oxide represented by [Formula 1] may be $Li_{1+x}[Ni_yCo_zMn_w]O_2$ or $Li_{1+x}[Ni_yCo_zMn_wAl_v]O_2$, but the lithium transition metal oxide represented by [Formula 1] is not limited thereto.

The lithium transition metal oxide may further include a coating layer including at least one coating element selected from the group consisting of Al, Ti, W, B, F, phosphorus (P), Mg, Ni, Co, Fe, Cr, V, Cu, Ca, Zn, Zr, Nb, Mo, Sr, Sb, Bi, silicon (Si), and S. For example, since a contact between the positive electrode active material and an electrolyte solution included in the lithium secondary battery is blocked by the coating layer to suppress the occurrence of the side reaction, life characteristics may be improved when used in the battery and, in addition, packing density of the positive electrode active material may be increased.

As described above, in a case in which the coating element is further included, an amount of the coating element in the coating layer may be in a range of 100 ppm to 10,000 ppm, for example, 200 ppm to 5,000 ppm based on a total weight of the lithium transition metal oxide. In a case in which the coating element is included in an amount within the above range, the side reaction with the electrolyte solution may be more effectively suppressed and the life characteristics may be further improved when the lithium transition metal oxide is used in the battery.

In a particle of the lithium transition metal oxide, amounts of the transition metal elements may be constant regardless of their positions or the amount of at least one metallic element may be changed depending on the position in the particle. For example, the lithium transition metal oxide may have a concentration gradient in which at least one component of Ni, Mn, and Co is gradually changed, and the expression "gradually changing concentration gradient" denotes that the component has a concentration distribution in which the concentration of the component is continuously gradually changed across the entire particle or in a specific region.

The positive electrode active material may be included in an amount of 70 wt % to 99.5 wt %, preferably 80 wt % to 99 wt %, and more preferably 85 wt % to 95 wt % based on the total weight of the positive electrode active material layer. Excellent energy density may be obtained in the above amount range.

The positive electrode active material layer may further include components, such as a conductive agent and a binder, in addition to the above-described positive electrode active material and metal oxide.

The binder is a component that assists in the binding between the active material and the conductive agent and in the binding with a current collector, wherein the binder is commonly added in an amount of 0.5 wt % to 20 wt % based on the total weight of the positive electrode active material layer. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated-EPDM, a styrene-butadiene rubber, a fluoro rubber, and various copolymers thereof.

Also, any conductive agent may be used as the conductive agent without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used. The conductive agent may be commonly added in an amount of 0.5 wt % to 20 wt % based on the total weight of the positive electrode active material layer.

The positive electrode of the present invention including the above-described positive electrode active material layer may be prepared by a general method of forming a positive electrode which is known in the art. For example, the positive electrode may be prepared by a method of coating a positive electrode collector with a positive electrode material mixture, in which the components of the positive electrode active material layer are dispersed in an organic solvent, and then drying and rolling the coated positive electrode collector, or may be prepared by casting the positive electrode material mixture on a separate support and then laminating a film separated from the support on the positive electrode collector.

In this case, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The solvent of the positive electrode material mixture may be a solvent normally used in the art. For example, dimethyl sulfoxide (DMSO), isopropyl alcohol, N-methylpyrrolidone (NMP), acetone, water, or a mixture thereof may be used as the solvent. An amount of the solvent used may be appropriately adjusted in consideration of coating processability of the positive electrode material mixture, manufacturing yield, and physical properties of the final product.

Secondary Battery

Next, a secondary battery according to the present invention will be described.

The secondary battery according to the present invention includes the above-described positive electrode of the present invention, a negative electrode, a separator, and an electrolyte. Specifically, the secondary battery of the present invention includes a positive electrode, a negative electrode disposed to face the positive electrode, a separator disposed between the positive electrode and the negative electrode, and an electrolyte, wherein the positive electrode is the above-described positive electrode of the present invention, that is, the positive electrode which includes the positive electrode active material and the metal oxide containing the metallic element having a binding potential with lithium of 0.5 V to 4 V in the positive electrode active material layer. Since the positive electrode is the same as described above, detailed descriptions thereof will be omitted.

A negative electrode usable in the field of lithium secondary batteries may be used as the negative electrode, and types thereof are not particularly limited. For example, the negative electrode may include a negative electrode collector and a negative electrode active material layer disposed on at least one surface of the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. The negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer includes a negative electrode active material, and may further selectively include at least one selected from a binder and a conductive agent, if necessary.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_v$ (0<v<2), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material.

The binder and the conductive agent may be the same as those previously described in the positive electrode.

The negative electrode may be prepared by coating the negative electrode collector with a negative electrode material mixture, in which the negative electrode active material, the binder, and the conductive agent are dispersed in a solvent, and then drying the coated negative electrode collector, or may be prepared by casting the negative electrode material mixture on a separate support and then laminating a film separated from the support on the negative electrode collector.

Next, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used.

Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

As the electrolyte, an organic liquid electrolyte, an inorganic liquid electrolyte, a solid polymer electrolyte, a gel-type polymer electrolyte, a solid inorganic electrolyte, or a molten-type inorganic electrolyte, which may be used in the preparation of the lithium secondary battery, may be used, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as Ra-CN (where Ra is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, LiN(CF$_3$SO$_2$)$_2$, LiCl, LiI, or LiB(C$_2$O$_4$)$_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate; pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the electrolyte components. In this case, the additive may be included in an amount of 0.1 wt % to 5 wt % based on a total weight of the electrolyte.

The secondary battery using the above-described positive electrode of the present invention has better thermal stability than a conventional secondary battery which does not include a metal oxide in a positive electrode active material layer.

The present inventors have measured self-heating time and instantaneous calorific value of the secondary battery of the present invention using accelerating rate calorimetry. A specific measurement method is as follows.

Figure 3:
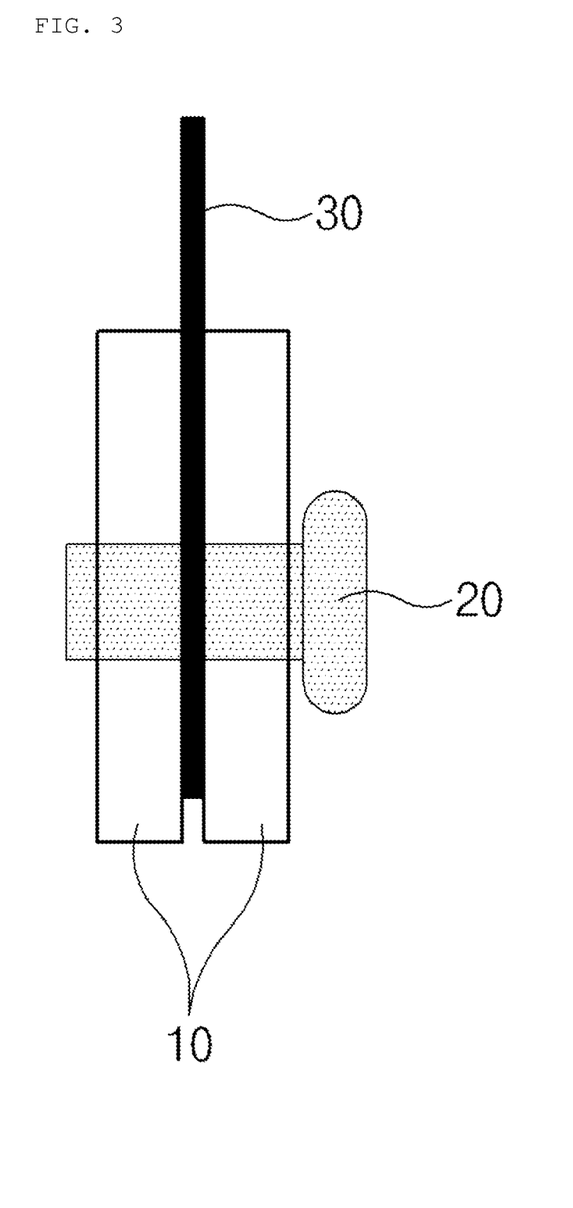
FIG. 3 is a view for explaining a temperature measurement sample according to the accelerating rate calorimetry.

First, after an electrode assembly composed of the positive electrode of the present invention/separator/negative electrode is put in a pouch and an electrolyte is injected, the pouch is sealed to prepare two mono cells. Then, as illustrated in FIG. 3, a temperature measuring device (thermometer) 30 is inserted between mono cells 10 and then bound with an aluminum band 20 to prepare a sample. A process, in which the sample thus prepared is put in a chamber equipped with a heating device, the temperature is increased to a set temperature at a predetermined heating rate, and the chamber temperature is then held for a predetermined time, is repeated two or more times. In this case, temperature of the battery cell is monitored in the temperature holding section, wherein, if the heating rate of the battery cell is higher than a certain level, it is evaluated that self-heating has occurred, and, if it is determined that the self-heating has occurred, the temperature of the chamber is increased to be equal to the temperature of the battery cell to prevent a self-heating amount of the battery cell from being lost by heat transfer.

In the present invention, the heating may be performed until the chamber temperature becomes 200° C. or more, for example, 205° C., and the heating rate may be about 1° C./min to 5° C./min, but the present invention is not limited thereto.

The self-heating time denotes total time during which the self-heating of the battery cell occurs, which is measured by the above method, and the instantaneous calorific value denotes a value obtained by first differentiating the temperature of the battery cell measured by the above-described method with respect to time.

As a result of measuring the self-heating time and instantaneous calorific value of the secondary battery according to the present invention by the above-described method, with respect to the secondary battery of the present invention, the self-heating time until the temperature reaches 205° C. is increased by 30% or more in comparison to that of a secondary battery including a positive electrode which includes a lithium transition metal oxide having the same composition and does not include a metal oxide, and the instantaneous calorific value is low at 0.3 or less in the entire section.

The long self-heating time until the temperature reaches a specific temperature means that heat generation is delayed under a high-temperature condition, wherein it demonstrates that the secondary battery of the present invention has better thermal stability than the conventional secondary battery. Also, since the instantaneous calorific value of the secondary battery of the present invention is lower than that of the conventional secondary battery, the risk of explosion due to instantaneous heat generation is very low.

Hereinafter, the present invention will be described in more detail, according to specific examples.

Example 1

Li[Ni$_{0.83}$Co$_{0.075}$Mn$_{0.075}$Al$_{0.02}$]O$_2$ having a concentration gradient as a positive electrode active material, metal oxide MoO$_3$, a carbon black conductive agent, and a PVdF binder were mixed in an N-methylpyrrolidone solvent at a weight ratio of 97.2:0.3:1:1.5 to prepare a positive electrode material mixture, and an aluminum current collector was coated with the positive electrode material mixture, dried at 130° C., and then rolled to prepare a positive electrode.

A negative electrode active material, a carbon black conductive agent, and a PVdF binder were mixed in an N-methylpyrrolidone solvent at a weight ratio of 97:1.5:1.5 to prepare a negative electrode material mixture, and one surface of a copper current collector was coated with the negative electrode material mixture, dried at 130° C., and then rolled to prepare a negative electrode.

After an electrode assembly was prepared by disposing a porous polyethylene separator between the positive electrode and negative electrode prepared as described above and the electrode assembly was disposed in a pouch, each mono cell secondary battery was prepared by injecting an electrolyte solution into the pouch. In this case, as the electrolyte solution, a solution obtained by dissolving LiPF$_6$ in a concentration of 1M in a non-aqueous solvent, in which ethylene carbonate (EC), dimethyl carbonate (DMC), ethylmethyl carbonate (EMC) were mixed in a weight ratio of 3:4:3, was used.

Example 2

A positive electrode and a secondary battery were prepared in the same manner as in Example 1 except that V$_2$O$_5$, instead of MoO$_3$, was used as a metal oxide.

Example 3

A positive electrode and a secondary battery were prepared in the same manner as in Example 1 except that ZrO$_2$, instead of MoO$_3$, was used as a metal oxide.

Example 4

A positive electrode and a secondary battery were prepared in the same manner as in Example 1 except that TiO$_2$, instead of MoO$_3$, was used as a metal oxide.

Comparative Example 1

A positive electrode and a secondary battery were prepared in the same manner as in Example 1 except that a metal oxide was not used and Li[Ni$_{0.83}$Co$_{0.075}$Mn$_{0.075}$Al$_{0.02}$]O$_2$ having a concentration gradient, a carbon black conductive agent, and a PVdF binder were mixed in an N-methylpyrrolidone solvent at a weight ratio of 97.5:1:1.5 to prepare a positive electrode material mixture.

Comparative Example 2

A positive electrode and a secondary battery were prepared in the same manner as in Example 1 except that a metal oxide was not used and Li[Ni$_{0.83}$Co$_{0.075}$Mn$_{0.075}$Al$_{0.02}$]O$_2$ having a uniform composition, a carbon black conductive agent, and a PVdF binder were mixed in an N-methylpyrrolidone solvent at a weight ratio of 97.5:1:1.5 to prepare a positive electrode material mixture.

Experimental Example

Two of each secondary battery prepared in Examples 1 to 4 and Comparative Examples 1 and 2 were prepared, and a thermometer was inserted between the two secondary batteries and then bound with an aluminum band to prepare a sample. Then, the sample was put in a chamber equipped with a heating device, and chamber temperature was set such that, after the temperature was increased to 120° C. at a heating rate of 2° C./min, the temperature was held for 2 hours, the temperature was again increased to 150° C. at a heating rate of 2° C./min when the holding time was completed, the temperature was then held for 2 hours, the temperature was again increased to 205° C. at a heating rate of 2° C./min, and the temperature was then held for 30 minutes. Then, temperature of the sample was monitored to measure whether or not self-heating occurred and the temperature and self-heating time of the secondary battery in a self-heating section, and an instantaneous calorific value was measured based on this.

In a case in which a heating rate of the sample temperature was 0.02° C./min or more, it was evaluated that the self-heating occurred, wherein, if it was determined that the self-heating occurred, the existing set temperature was ignored and the temperature of the chamber was increased to be equal to the temperature of the battery cell to prevent a self-heating amount of the battery cell from being lost by heat transfer. Also, the instantaneous calorific value was calculated by first differentiating the temperature of the secondary battery in the self-heating section with respect to the self-heating time.

Figure 1:
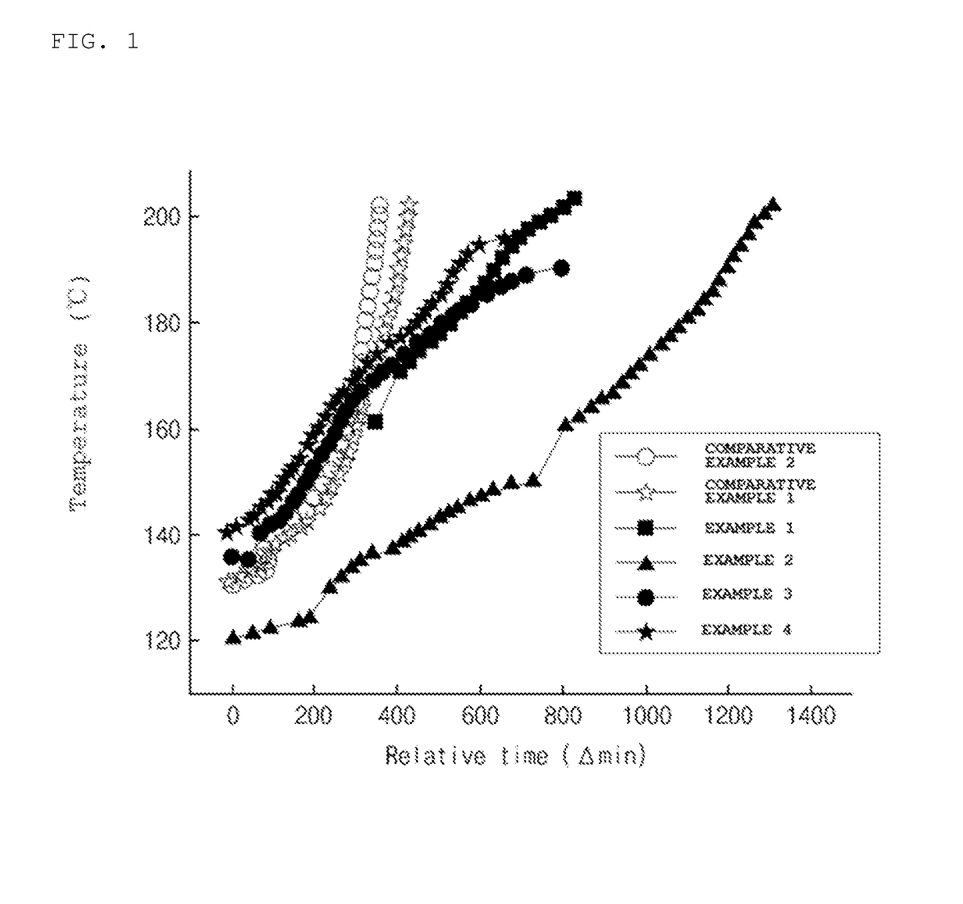
FIG. 1 is a graph illustrating self-heating times of mono cells including positive electrodes prepared in Examples 1 to 4 and Comparative Examples 1 and 2 of the present invention which were measured by accelerating rate calorimetry.
Figure 2:
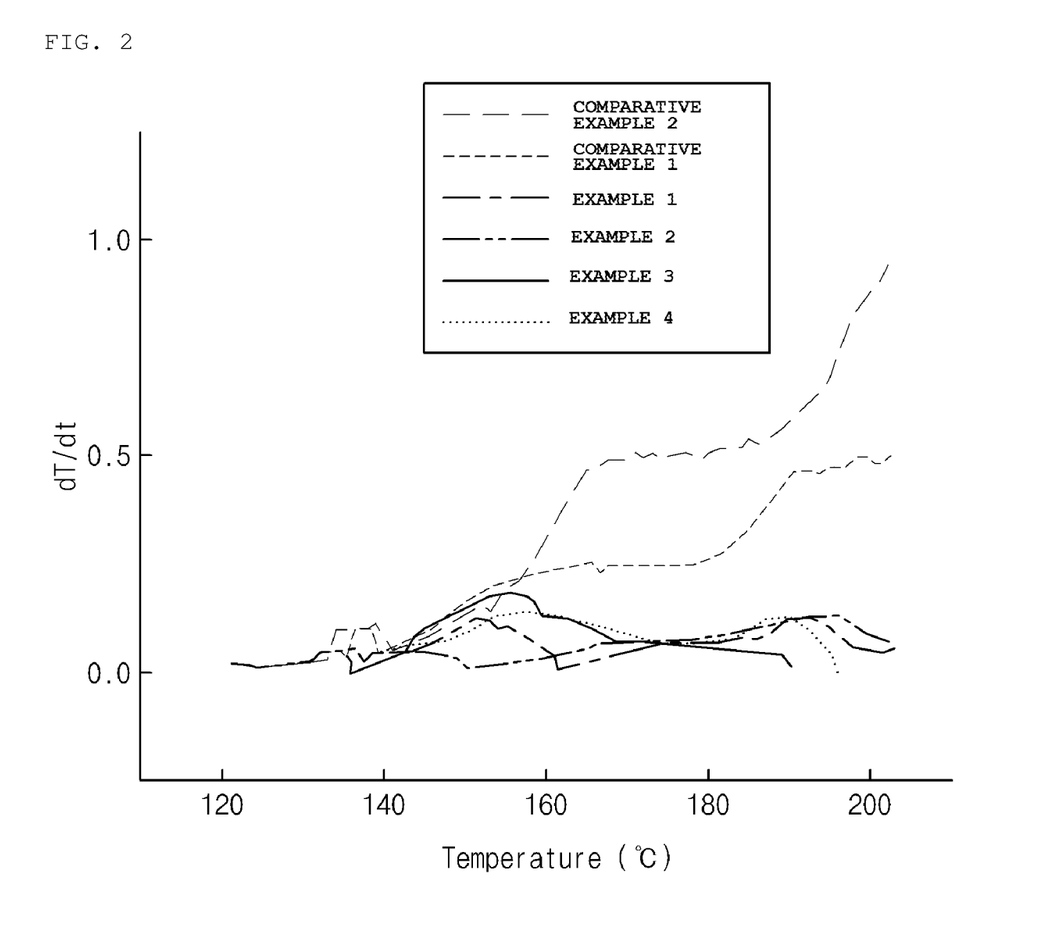
FIG. 2 is a graph illustrating instantaneous calorific values of the mono cells including the positive electrodes prepared in Examples 1 to 4 and Comparative Examples 1 and 2 of the present invention.

A self-heating time vs. secondary battery temperature graph, which was measured by the above method, is illustrated in FIG. 1, and a graph, in which a value obtained by first differentiating the graph of FIG. 1 is shown with respect to temperature, is illustrated in FIG. 2. Also, self-heating times and maximum instantaneous calorific values calculated by the graphs of FIGS. 1 and 2 are illustrated in Table 1 below. Values in parentheses are a rate of increase in the self-heating time and a rate of decrease in the maximum instantaneous calorific value in comparison to Comparative Example 1.

TABLE 1

|  | Self-heating time [min] | Maximum instantaneous caloric value |
|---|---|---|
| Example 1 | 829 (131%) | 0.129 (74.2%) |
| Example 2 | 1307 (203%) | 0.118 (76.4%) |
| Example 3 | 793 (84%) | 0.183 (63.4%) |
| Example 4 | 680 (58.4%) | 0.141 (71.8%) |
| Comparative Example 1 | 431 | 0.501 |
| Comparative Example 2 | 358 | 0.948 |

According to [Table 1] and FIGS. 1 and 2, it may be confirmed that the secondary batteries of Examples 1 to 4 including the metal oxide in the positive electrode active material layer had significantly better thermal stabilities than the secondary batteries of Comparative Examples 1 and 2.

The invention claimed is:

1. A positive electrode for a secondary battery, comprising:
   a positive electrode active material layer which comprises:
   a positive electrode active material including a lithium transition metal oxide which contains nickel, cobalt, and manganese and having an atomic ratio of nickel in total transition metals of 80 atm % or more; and
   a metal oxide including a metallic element having a binding potential with lithium of 0.5 V to 4 V,
   wherein the metal oxide is included in an amount of 0.1 wt % to 2 wt % based on a total weight of the positive electrode active material layer, and
   wherein the lithium transition metal oxide has a concentration gradient in which at least one element of the nickel, the cobalt, or the manganese in the lithium transition metal oxide is continuously changed across an entire particle or in a specific region.

2. The positive electrode of claim 1, wherein the metal oxide comprises at least one metallic element selected from the group consisting of molybdenum (Mo), vanadium (V), titanium (Ti), zirconium (Zr), iron (Fe), niobium (Nb), tungsten (W), copper (Cu), nickel (Ni), manganese (Mn), cobalt (Co), bismuth (Bi), antimony (Sb), gallium (Ga), and germanium (Ge).

3. The positive electrode of claim 1, wherein the metal oxide comprises at least one selected from the group consisting of MoO$_3$, V$_2$O$_5$, ZrO$_2$, TiO$_2$, WO$_3$, CuO, NiO, MnO$_2$, Co$_3$O$_4$, Bi$_2$O$_3$, Sb$_2$O$_3$, Ga$_2$O$_3$, and GeO$_2$.

4. The positive electrode of claim 1, wherein the lithium transition metal oxide is represented by Formula 1:

$$Li_{1+x}[Ni_yCo_zMn_wM_v]O_{2-p}B_p \quad \text{[Formula 1]}$$

wherein, in Formula 1, $0 \leq x \leq 0.3$, $0.8 \leq y < 1$, $0 < z < 0.2$, $0 < w < 0.2$, $0 \leq v \leq 0.1$, and $0 \leq p \leq 0.1$, M comprises at least one element selected from the group consisting of tungsten (W), copper (Cu), iron (Fe), vanadium (V), chromium (Cr), titanium (Ti), zirconium (Zr), zinc (Zn), aluminum (Al), tantalum (Ta), yttrium (Y), indium (In), lanthanum (La), strontium (Sr), gallium (Ga), scandium (Sc), gadolinium (Gd), samarium (Sm), calcium (Ca), cerium (Ce), niobium (Nb), magnesium (Mg), boron (B), and molybdenum (Mo), and B comprises at least one element selected from the group consisting of fluorine (F), chlorine (Cl), bromine (Br), iodine (I), astatine (At), and sulfur (S).

5. The positive electrode of claim 1, wherein the amount of the metal oxide is from 0.1 to less than 1 wt % based on the total weight of the positive electrode active material layer.

6. The positive electrode of claim 1, wherein the amount of the metal oxide is from 0.1 to 0.5 wt % based on the total weight of the positive electrode active material layer.

7. A secondary battery comprising the positive electrode of claim 1; a negative electrode; a separator; and an electrolyte.

\* \* \* \* \*